United States Patent Office 2,707,450
Patented May 3, 1955

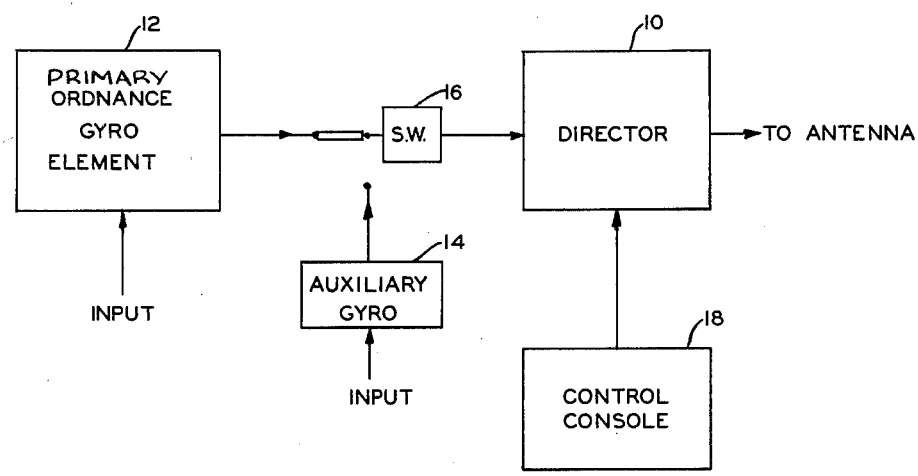

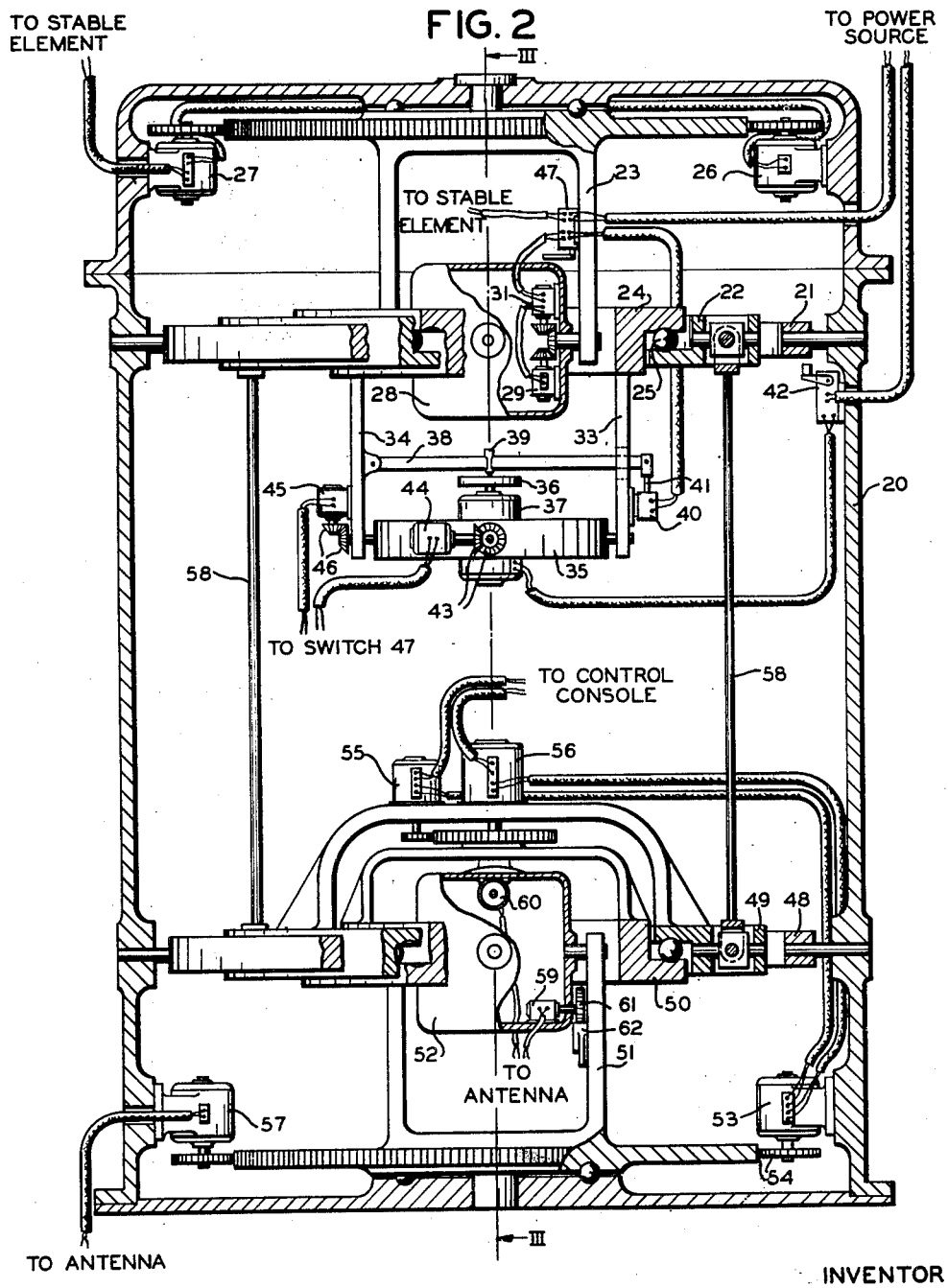

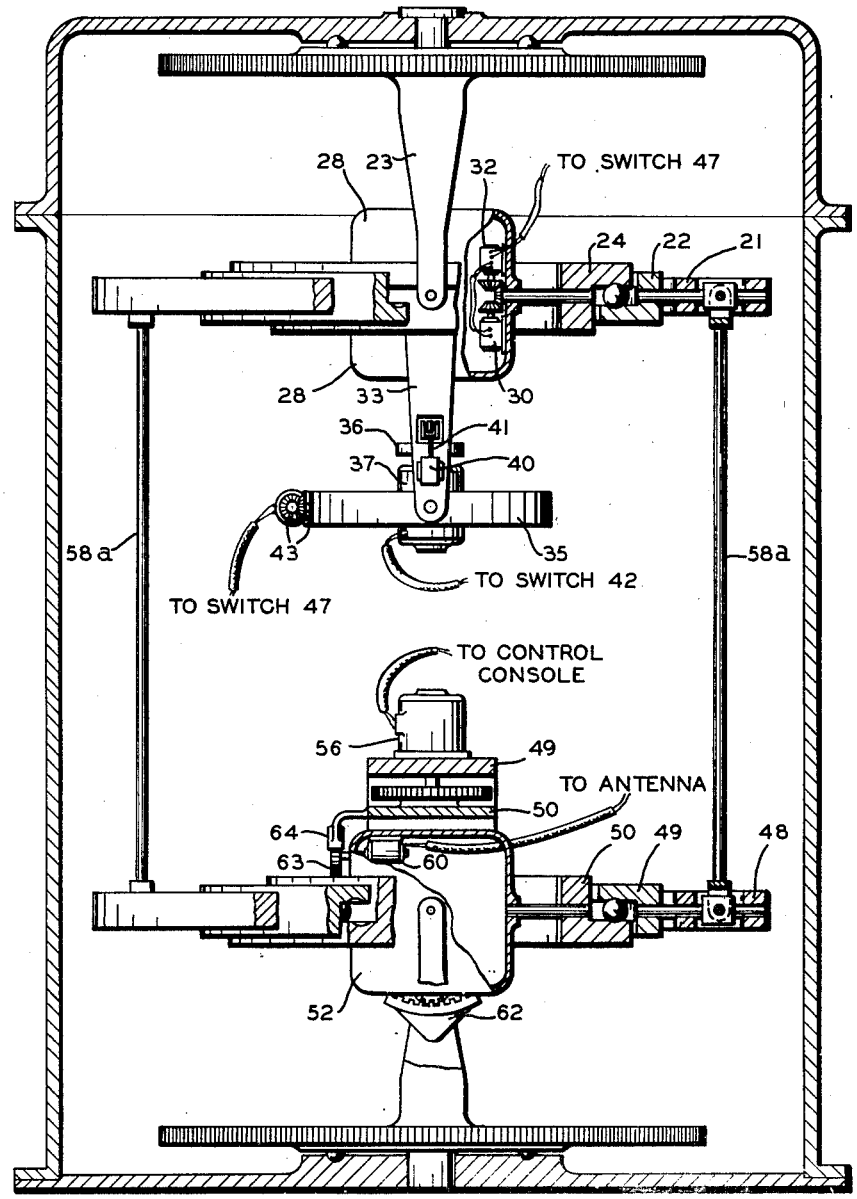

2,707,450

GYROSCOPICALLY STABILIZED REFERENCE MEMBER

Walkley B. Ewing, Cambridge, Mass., assignor, by mesne assignments, to the United States of America as represented by the Secretary of the Navy Application September 18, 1945, Serial No. 617,143

8 Claims. (Cl. 114—191)

This invention relates to directors for aiming apparatus carried on mobile, floating or swinging craft, and more particularly to improvements in directors adapted to correct the motion of the apparatus being aimed for the tilt of the platform or support upon which the apparatus is mounted under conditions where the tilt is subject to variations.

The invention finds particularly useful application for the aiming of guns, searchlights, and radio echo detection apparatus carried on board ship. While the invention is herein illustrated in connection with the aiming of radio echo detection apparatus, it is to be understood that similar application can be made of this invention for the aiming of guns, searchlights or other apparatus.

In my copending application entitled, "Tilt Correcting Director," Serial No. 614,563, filed September 18, 1945, now Patent No. 2,604,698, dated July 29, 1952, it was proposed to operate the radio echo detection director using the output of a gyroscopic stabilizing element commonly used in connection with ordnance equipment to maintain a stable reference member necessary for the operation of the director equipment. It has been found that although the gyroscope of this gyroscopic stabilizing element remains operative up to angles of roll of approximately 43 degrees, the output of this gyroscopic element is so limited that no correction is made for roll after the roll exceeds 22 degrees or thereabout. It is important that the radio echo detection aiming device should be stabilized even when a ship is tilted beyond the limit of output of this gyroscopic element, although it is not essential that ordnance equipment be stabilized at angles of roll in excess of 22 degrees. My present invention makes it possible to use a simple gyroscopic element which need not be compensated for "wandering" or "drift," in connection with the system disclosed in my copending application heretofore referred to, to control the stabilized reference member for the length of the period during which the limit of output of the primary gyroscopic stabilizing element is exceed.

In general, my invention consists of associating a simple auxiliary gyroscopic element with the system controlling the reference member of the director equipment in such a manner that the auxiliary gyroscope is normally held inoperative in a stable vertical position under control of the primary or ordnance gyroscopic stabilizing element. When the roll of the ship approaches the limit of output of the primary gyroscopic element, the auxiliary gyroscope is released and the input to the device for maintaining a stabilized reference member is switched from the primary gyroscopic element to the auxiliary gyroscopic element. When the period of excessive roll angle angle is passed, the input to the apparatus for maintaining a stable reference member is switched back to the primary gyroscopic element and the auxiliary gyroscope is again clamped into a stable vertical position so that when released again it will start from the desired position. Normally, the auxiliary gyroscope will take over control of the stabilized reference member only for a period of several seconds or possibly 20 or 30 seconds.

An object of this invention is to provide a tilt-correcting director apparatus which simultaneously corrects both azimuth and elevation for motion of the craft on which the apparatus is carried having an auxiliary device to control stabilization of the director during periods of excessive roll and pitch of said craft.

A further object of this invention is to provide a tilt-correcting director of the type above described having means to retain the auxiliary device in a predetermined position at all times during which said auxiliary device is inoperative.

A still further object of this device is to provide means for energizing the auxiliary gyroscope prior to the release thereof from its predetermined position.

Further objects of this invention as well as its construction, arrangement, and operation, will be apparent from the following description and claims in connection with the accompanying drawings, in which:

Fig. 1 shows diagrammatically, a system for the application of the invention, illustrating the principles of the invention;

Fig. 2 shows in a general way a director of the type explained in my copending application Serial No. 614,563, filed September 18, 1945, above mentioned, of a form adapted for control by an ordnance gyroscopic stabilizing element herein modified in accordance with the principles of this invention.

Fig. 3 is a view taken along the lines III—III of Fig. 2.

Referring to Fig. 1, there is illustrated a schematic diagram of a system constructed in accordance with the principles of this invention in which there is shown a director 10 for transmitting control signals to an antenna, the orientation of which is to be controlled and which is to be independent of disturbing motions such as pitch and roll of the vessel on which the system is mounted. As shown, director 10 is normally stabilized by output signals from a gyroscopic stabilizing element 12 which is also used to stabilize ordnance mechanism on the vessel. An auxiliary gyroscopic element 14 is provided to stabilize director 10 at all times during which the limit of output of element 12 is exceeded. Switch 16 is mounted on the vessel and operates in response to a predetermined amount of roll of said vessel to cut off the output of element 12 from director 10 and to connect the output of element 14 thereto. A control console 18 is shown, the function of which is to introduce signals corresponding to desired azimuth and elevation components into director 10.

Referring to Fig. 2 and to the cross-sectional view thereof, Fig. 3, there is shown a director having an outer casing 20 in which two concentric gimbal systems are positioned in the upper portion thereof having all gimbal axes parallel to the ship's deck reference plane when the pitch and roll values are equal to zero. One of these gimbal systems comprises a roll member in the form of a ring 21 and a pitch member in the form of a ring 22. These members are constructed with their axes parallel to the roll and pitch axes, respectively, of the ship.

The second gimbal system mounted in the upper portion of casing 20 includes a yoke 23 and a level ring 24, the latter ring being mounted on, and rotatable with respect to, pitch ring 22 by means of a ball race 25. Yoke 23 of this second gimbal system is carried by casing 20, being rotatably mounted thereon and being driven about this mounting by means of a motor 26 which receives signals from a train angle servo transmitter of the primary stabilizing element through a control transformer 27. In this manner, yoke 23 is maintained in an orientation parallel to train angle position of the cross-level support yoke element of the gyroscopic stabilizing device. Carried by members 23 and 24 is a housing 28 constituting a cross-level member which is pivotally mounted on said members, the pivots being disposed at right angles to each other. Positioned within housing 28 are two motors 29 and 30 together with control transformer synchros 31 and 32 respectively, therefor. Referring now to Fig. 2, and with particular reference to the cross-sectional view thereof, Fig. 3, motor 29 is adapted to rotate housing 28 about pivots associated with yoke 23, while motor 30 is adapted to rotate level ring 24 about pivots associated with housing 28. These motors and servo controls therefor are connected to servo transmitters in the ordnance gyroscopic stabilizing element and are actuated in response to signals received from the last-mentioned servo transmitters which transmit level and cross-level signals as determined by roll and pitch of the vessel. In this manner, level ring 24 is maintained in a horizontal position to serve as a horizontal reference member irrespective of disturbing motions of the vessel. It will readily be understood that level ring 22 which carries level ring 24 by means of ball race 25 will be maintained in a horizontal position at all times, this result being obtained through action of level member 24 acting through ball race 25.

Rigidly secured to level ring 24 are two arms, 33 and 34 having a gimbal ring 35 pivotally mounted to the outer ends thereof, the axes of the pivots being oriented parallel to the axes associated with cross level element 23. Positioned within gimbal ring 35 is a pivotally mounted auxiliary gyroscope 36 driven by a motor 37, the pivots about which gyroscope 36 is allowed to swing being disposed at right angles to the pivots associated with cross level element 23. It will be readily understood that the gimbals of auxiliary gyroscope 36 will be maintained in an orientation parallel to the gimbals of the primary gyroscopic element. Pivotally secured to arm 34 and extending through an opening in arm 33 is a cross arm 38 having a center pin 39 extending downwardly therefrom, cross arm 38 being connected to a push-type solenoid 40 attached to arm 33 by means of a connecting link 41. Center pin 39 is adapted to cooperate with a bearing in the flywheel of gyroscope 36 in such manner as to retain the auxiliary gyroscope in a vertical position by action of gravity pressure of pin 39. Secured to casing 20 and positioned with respect to roll ring 21 so as to be operated by contact therewith is a combined switch and timing mechanism 42 of well known construction. Switch 42 is electrically connected to motor 37 and may be so positioned as to be tripped by ring 21 whenever the roll of the vessel exceeds an arbitrary limit such as 15 degrees. Operation of switch 42 results in the energization of motor 37, while the timing feature of the switch mechanism causes motor 37 to continue operation for a specific period of time thereafter such as, for instance, thirty minutes. Fastened to gimbal ring 35 and controlled by rotation of gyroscope 36 with respect to gimbal ring 35 through gears 43 is a control transformer synchro 44 which produces an error signal if ring 35 departs from its normal position with respect to the gyro. In like manner a similar control transformer synchro 45 is provided, the synchro in this instance being secured to arm 34 and connected to axes about which gimbal ring 35 is allowed to pivot through a set of gears 46. It will be readily understood that synchro 45 will develop an error signal if arm 34 departs from its normal position with respect to ring 35. Fixed on cross level yoke 23 and associated with the cross level axis about which housing 28 is allowed to rotate, there is provided a switch 47 which is actuated in response to level and cross level order so arranged that when the level or cross level order from the ordnance gyroscope exceeds twenty-one degrees, that is whenever the angle of rotation of housing 28 about the cross level axis with respect to yoke 23 exceeds twenty-one degrees, switch 47 will be tripped, thereby energizing solenoid 40 and releasing pin 39 from contact with the flywheel of gyroscope 36. Switch 47, in addition to connecting solenoid 40 to a source of power, is adapted to simultaneously transfer the source of signals to servos 31 and 32 from the ordnance stabilizing element to the servo transmitters 45 and 44 respectively, associated with auxiliary gyroscope 36.

In the lower portion of casing 20 there is positioned a second pair of concentric gimbal systems the outer system being composed of a roll member in the form of a ring 48 and a pitch ring 49 having their axes disposed parallel to the roll and pitch axes of rings 21 and 22 respectively. Disposed within pitch member 49 is a second gimbal system including a level ring 50 and a cross-level support yoke 51 having a housing 52 pivotally mounted with respect to said ring and yoke, the pivots being disposed at right angles with respect to each other. Cross-level support yoke 51 is carried by casing 20, said yoke being rotatably mounted thereon and rotatable with respect thereto, being driven about said rotatable mount by means of a suitable servo motor 53 driving through a suitable gear train 54. Servo motor 53 is controlled by a pair of control transformers 55 and 56 which operate in response to relative bearing signals transmitted by generator synchros associated with a radio echo detection control console. A take-off servo transmitter 57 is associated with gear 54 to transmit train order data to a corresponding train order servo associated with the antenna being stabilized. Mechanically connecting pitch rings 22 and 49 is a pair of connecting rods 58, while connecting roll members 21 and 48 there is provided a second pair of connecting rods 58a, said rods being radially positioned at 90 degrees with respect to rods 58. All rods are of equal length, the length of which should be the same length, pin axis to pin axis, as the distance, center to center, between the gimbal systems. As heretofore explained, level ring 24 normally maintains pitch ring 22 in a horizontal position independent of disturbing motions of the vessel. It will be readily understood that pitch member 49 and level member 50 will likewise be maintained in a horizontal position.

Mounted within housing 52 are cross-level and level servo transmitters 59 and 60, respectively, transmitter 59 being mechanically connected to cross-level support member 51 by a gear and sector 61 and 62 and oriented in such manner as to transmit signals to a servo receiver associated with the cross-level member of the antenna being stabilized. Again with particular reference to Fig. 3, level servo transmitter 60 is mechanically connected to level member 50 by means of a gear and sector 63 and 64, said servo transmitter being oriented in housing 52 in such manner as to transmit signals to a second servo receiver associated with the level member of the antenna being stabilized.

In operation, motor 26 rotates cross-level support yoke 23 about its mounting in accordance with signals received from a train angle servo transmitter associated with the ordnance gyroscopic stabilizing mechanism, thereby maintaining cross-level support member 23 in an orientation parallel to the train angle position of the cross-level element of the gyroscopic stabilizing device. Housing 28 is rotated with respect to yoke 23 by action of motor 29, while level ring 24 is rotated with respect to housing 28 through action of motor 30, motors 29 and 30 being controlled by level and cross-level servo transmitters in the ordnance or primary gyroscopic stabilizing element which are actuated in response to roll and pitch of the vessel. In this manner, level member 24 is normally maintained in a horizontal position independent of roll and pitch motions of the vessel. It has previously been pointed out that level member 22 is likewise maintained in a horizontal position at all times, horizontal ring 24 being in physical contact therewith through ball race 25. As heretofore explained, it has been discovered that while the primary or ordnance gyroscopic element remains operative up to angles of roll of about forty-three degrees, the output of the ordnance gyroscopic element is so limited that no correction is made for roll after the roll exceeds about twenty-two degrees. Auxiliary gyroscope 36 is normally idle and held in a stable vertical position under the control of the ordnance gyroscopic element by means of centering pin 39. When the ship roll exceeds an arbitrary limit such as fifteen degrees, for example, limited detent switch 42 associated with roll ring 21 starts gyro 36 so that the auxiliary system is ready for action, but still inactive and still fully stabilized by the inputs from the ordnance stabilizing element. As heretofore stated, switch 42 is equipped with a standard time delay device so as to connect motor 35 with a source of power for a predetermined period of time before cutting off. When the roll reaches a point approaching the limit of output of the primary stabilizing element, push solenoid 40 is energized through action of switch 47, raising centering pin 39 and releasing gyroscope 36. Simultaneously switch 47 transfers the source of signals to the servos which stabilize ring 24 from the primary stabilizing element to the control transformer synchros 44 and 45 of the auxiliary system. The stator windings of these control transformer synchros are positioned to produce zero error signal when the gyroscopic axis is normal to the gimbal axes. Any departure of the frame from horizontal produces appropriate error signals from the control transformer synchros to the servos to maintain ring 24 in a horizontal position. The auxiliary gyroscope is thus free to transmit control signals for the few seconds that the roll of the ship exceeds the limit of output of the primary stabilizing element. Returning within these limits, control is returned to the primary stabilizing element and auxiliary gyroscope 36 is re-aligned if it has suffered any deflection from the vertical position during its brief control period. Level ring 49 together with level ring 50 which is in physical contact with ring 49 by means of a ball race similar to race 25, are maintained in a horizontal position at all times, either through action of the primary or secondary gyroscopic stabilizing elements, ring 49 being mechanically connected to ring 22 by connecting rods 58, while rings 21 and 48 are connected by rods 58a. Yoke member 51, which is rotatably mounted in the plane of the deck of the vessel, is rotated about its mount by action of servo motor 53 which is controlled by control transformers 55 and 56 which receive relative bearing signals from a radio echo detection control console. It will readily be understood that servo motor 53 drives yoke 51 in the deck plane in response to signals received by relative bearing synchros in the horizontal plane. Members 49 and 50 therefore rotate with respect to each other by the value of the relative target bearing angle, whereas yoke 51 rotates with respect to casing 20 by an amount equal to the aforementioned value plus or minus deck tilt correction. As heretofore stated servo transmitter 59 is operative to develop cross-level synchro signals, these signals being transmitted to a corresponding servo receiver associated with the cross-level axis of the apparatus being aimed. In like manner servo transmitter 60 is operative to transmit level angle signals to a servo receiver associated with the level axis of the apparatus being aimed. Servo transmitter 57 transmits train angle signals in accordance with rotation of yoke member 51 as determined by operation of servo motor 53, these signals being transmitted to a servo mechanism associated with the train axis of the apparatus being aimed.

It is to be understood that various modifications and changes may be made in this invention without departing from the spirit and scope thereof as set forth in the appended claims.

What is claimed is:

1. In a director for aiming-apparatus carried on floating or mobile craft subject to disturbing motions, a reference member, a primary stabilizing element coupled to and normally retaining said member in a predetermined reference position, an auxiliary stabilizing element operative on and retaining said member in said reference position, and means associated with said reference member responsive to angular motion of said craft for transferring control of said reference member from said primary stabilizing element to said auxiliary stabilizing element.

2. In a director for aiming-apparatus carried on mobile or floating craft subject to disturbing motions, a reference member, a primary stabilizing element coupled to and normally retaining said reference member in a reference position independent of said disturbing motions, an auxiliary stabilizing element operative on and retaining said reference member in said reference position, means associated with said reference member responsive to disturbing motion of said craft for energizing said auxiliary stabilizing element, and a second means associated with said reference member responsive to said disturbing motion for transferring control of said reference member from said primary stabilizing element to said auxiliary stabilizing element.

3. In a director for aiming-apparatus carried on mobile or floating craft subject to disturbing motions, a reference member, a primary stabilizing element normally retaining said reference member in a predetermined position independent of disturbing motion of said craft, an auxiliary stabilizing element carried by said reference member, retaining means normally maintaining said auxiliary stabilizing element in a predetermined position, means responsive to disturbing motion of said craft for energizing said auxiliary stabilizing element, and means responsive to said disturbing motion for transferring control of said reference member from said primary stabilizing element to said auxiliary stabilizing element.

4. In a director for aiming-apparatus carried on mobile or floating craft subject to roll and pitch motions, a reference member, a primary stabilizing element normally retaining said reference member in a predetermined position independent of said roll and pitch motions, an auxiliary stabilizing element carried by said reference member, retaining means for normally maintaining said auxiliary stabilizing element in a predetermined position with respect to said reference member, means responsive to a predetermined amount of roll of said craft for energizing said auxiliary stabilizing element, and means responsive to a predetermined amount of roll of said craft for transferring control of said reference member from said primary stabilizing element to said auxiliary stabilizing element.

5. In a director for aiming-apparatus carried on mobile or floating craft subject to roll and pitch motions, a reference member normally oriented in a horizontal position, a primary gyroscope normally retaining said reference member in said horizontal position, an auxiliary gyroscope carried by said reference member, a centering pin associated with said auxiliary gyroscope for normally retaining the axis of said auxiliary gyroscope in a vertical position, means responsive to a predetermined amount of roll and pitch of said craft for energizing said auxiliary gyroscope, and means responsive to a predetermined amount of roll and pitch of said craft for releasing said centering pin from said auxiliary gyroscope and for transferring control of said horizontal reference member from said primary gyroscope to said auxiliary gyroscope.

6. In combination, a reference member normally oriented in a horizontal position, a primary gyroscope normally retaining said reference member in said horizontal position, an auxiliary gyroscope carried by said reference member, centering means carried by said reference member and normally retaining the axis of said auxiliary gyroscope in a vertical position, means responsive to a predetermined amount of displacement of said reference member for energizing said auxiliary gyroscope, and means responsive to a predetermined amount of displacement of said reference member and carried thereby for disengaging said centering means from said auxiliary gyroscope and for transferring control of said reference member from said primary gyroscope to said auxiliary gyroscope.

7. Apparatus for maintaining a reference member in a horizontal position comprising, a primary gyroscope, means for normally maintaining said reference member in said horizontal position in response to signals from said primary gyroscope, a normally unenergized auxiliary gyroscope positioned to be actuated, a first limit switch for providing power to said auxiliary gyroscope in response to a first predetermined displacement of said reference member from said horizontal position, a pivot arm and centering pin carried by said reference member and bearing upon said auxiliary gyroscope for maintaining said auxiliary gyroscope immovable and under control of said primary gyroscope, a solenoid for releasing said pivot arm and centering pin from said auxiliary gyroscope, a second limit switch for actuating said solenoid positioned to be actuated in response to a second predetermined displacement of said reference member from said horizontal position, means also responsive to said second limit switch for transferring control of said reference member from said primary gyroscope to said auxiliary gyroscope, said auxiliary gyroscope providing signals for maintaining said reference member in a horizontal position only during periods of displacements greater than said second predetermined amount.

8. Apparatus for maintaining a reference member in a horizontal position aboard a mobile craft subject to disturbing motions comprising, a normally operative primary gyroscope, a normally unenergized auxiliary gyroscope, gimbal systems supporting said auxiliary gyroscope and said reference member, servomotors energized from said primary gyroscope for maintaining said auxiliary gyroscope and said reference member in a given position in said gimbal systems, a pivot arm carried by said reference member, a centering pin carried by said pivot arm and bearing upon said auxiliary gyroscope to maintain said auxiliary gyroscope normally immovable, a first limit switch including a time delay mechanism for providing power to said auxiliary gyroscope for a period determined by said time delay mechanism positioned to be actuated in response to a first predetermined amount of disturbing motions tending to displace said reference member from said horizontal position, a second limit switch positioned to be actuated by a second predetermined amount of disturbing motions tending to displace said reference member from said horizontal position, a solenoid actuated by said second limit switch for releasing said pivot arm and centering pin from said auxiliary gyroscope, means also responsive to said second limit switch for transferring control of said reference member from said primary gyroscope to said auxiliary gyroscope, and means also responsive to said second limit switch for returning control from said auxiliary gyroscope to said primary gyroscope upon cessation of disturbing motions exceeding said second predetermined amount.

References Cited in the file of this patent

UNITED STATES PATENTS 1,731,236   Dow  ---------------- Oct. 15, 1929